(12) United States Patent
Slesarev et al.

(10) Patent No.: US 11,506,632 B2
(45) Date of Patent: Nov. 22, 2022

(54) METHOD FOR PREDICTING A RESIDUAL OPERATING LIFE OF A STEEL ROPE

(71) Applicant: Obshchestvo s ogranichennoi otvetstvennostiu "INTRON PLIUS", Moscow (RU)

(72) Inventors: Dmitry Aleksandrovich Slesarev, Moscow (RU); Vasiliy Vasilevich Sukhorukov, Moscow (RU); Aleksei Veniaminovich Semenov, Moscow Region (RU)

(73) Assignee: Obshchestvo s ogranichennoi otvetstvennostiu "INTRON PLIUS", Moscow (RU)

( * ) Notice: Subject to any disclaimer, the term of this patent is extended or adjusted under 35 U.S.C. 154(b) by 10 days.

(21) Appl. No.: 17/340,587

(22) Filed: Jun. 7, 2021

(65) Prior Publication Data

US 2022/0120709 A1    Apr. 21, 2022

(51) Int. Cl.
    *G01N 27/82*    (2006.01)

(52) U.S. Cl.
    CPC ................................. *G01N 27/82* (2013.01)

(58) Field of Classification Search
    CPC ..................................................... G01N 27/82
    See application file for complete search history.

(56) References Cited

U.S. PATENT DOCUMENTS

| | | | |
|---|---|---|---|
| 2019/0360965 A1* | 11/2019 | Iijima | G01N 27/83 |
| 2020/0300811 A1* | 9/2020 | Hashime | G01N 21/952 |
| 2021/0380372 A1* | 12/2021 | Iijima | G01N 27/82 |
| 2022/0050152 A1* | 2/2022 | Iijima | G01N 27/023 |

* cited by examiner

*Primary Examiner* — Dominic E Hawkins
(74) *Attorney, Agent, or Firm* — Nadya Reingand

(57) ABSTRACT

The invention relates to a method for the nondestructive testing of steel rope parameters, particularly for predicting a residual operating life of a steel rope. The method for predicting the residual operating life of the steel rope comprises: —continuously monitoring and diagnosing a technical condition of the rope by continuously and simultaneously taking readings of Hall sensors, inductive coils, an eddy current sensor, a temperature sensor, a rope tension sensor and an odometer; —providing the readings to a control display unit (CDU) for cooperative processing; —based on the readings, determining an operating time and a safety factor of the rope; —comparing, by the CDU, the obtained values with allowable values; —making a conclusion on the technical condition of the rope; and—predicting the residual operating life of the rope.

6 Claims, 1 Drawing Sheet

METHOD FOR PREDICTING A RESIDUAL OPERATING LIFE OF A STEEL ROPE

CROSS-REFERENCES TO RELATED APPLICATIONS

This application claims priority to Russian application RU2020134400 filed Oct. 10, 2021.

FIELD OF THE INVENTION

The invention relates to a method for the nondestructive testing of steel-rope parameters, particularly for predicting a residual operating life of a steel rope.

BACKGROUND OF THE INVENTION

RU2204129C2 discloses a method for the nondestructive testing of a cross-section of elongated ferromagnetic objects and for the detection of localized defects thereof. The method comprises magnetizing an elongated segment of a rope and measuring magnetic field parameters in the magnetized segment. The presence of the localized defects and the cross-sectional area of the rope are determined based on the measured parameters. The disadvantage of this method is an insufficient measurement accuracy, as well as a failure to predict the residual operating life of the rope, since the method does not take into account a tensile load applied to the rope, an ambient temperature, a movement speed and other parameters of the physical condition of the rope.

RU2589496C1 discloses a method for monitoring a technical condition of a rope. The method comprises magnetizing a segment of the rope and measuring parameters of the rope by using two independent sensors. Each of the sensors registers wire breaks in the rope. The presence of a wire break and a density of wire breaks in the given segment of the rope are determined based on the measured parameters. Similarly, the disadvantages of this method include an insufficient measurement accuracy and a failure to automatically predict the residual operating life of the rope.

SUMMARY OF THE INVENTION

The problem to be solved by the invention is how to improve the accuracy of measuring parameters of a rope, as well as to provide the possibility of predicting a residual operating life of the rope in automatic mode.

The technical result provided when using the invention is an improvement in the accuracy of predicting the residual operating life of the rope, and an increase in the degree of safety of the rope exploitation.

The technical result is achieved by using a set of sensors operating in automatic mode. The set of sensors may include: a temperature sensor, an odometer, a Hall sensor, an inductive sensor, an eddy current sensor, and a rope tension sensor. The readings of all the sensors are taken continuously and simultaneously and processed automatically in a control display unit (hereinafter referred to as the CDU). An operating time and a safety factor of the rope are determined based on the readings in the CDU. The CDU compares the obtained values with maximum allowable limits stored in a CDU memory for the given rope type, makes a conclusion on a technical condition of the rope, decides whether its further exploitation is possible, and predicts a residual operating life of the rope.

The operating time of the rope may be determined either based on the readings of the odometer and the rope tension sensor or based on a number of operating cycles of the rope. The safety factor is determined based on a mathematical model in concert with data of localized defect and cross-section loss channels which are obtained from the Hall sensors and inductive coils, a rope lay length and a rope diameter which are obtained from the eddy current sensor, and initial data about a rope structure.

The residual operating life of the rope may be determined based on the obtained dependence of the safety factor on the operating time of the rope by comparing a current value of the safety factor with a maximum allowable limit of the safety factor for the given rope.

To avoid emergency situations during the rope exploitation, the CDU may block the use of the rope if the rope does not meet strength requirements, for example, by sending an inhibiting signal to a control unit of equipment exploiting the rope.

The safety factor of the rope is calculated after a rope testing cycle is performed by using sensors of a magnetic head (MH) of a defect detector. The operating time is calculated continuously during the rope exploitation.

Algorithm for Calculating the Operating Time of the Rope in Ton-Kilometers

For each pulse coming from the odometer, the following calculation is made:

$$Tkm[n]=Tkm[n-1]+(tkm1*M[n]+tkm2)*C*Ostep,$$

where $Tkm[n]$ is the value of the operating time at the n-th step, $Tkm[n-1]$ is the value of the operating time at the (n−1)-th step, $M[n]$ is the current output value of the rope tension sensor, $tkm1$ is the multiplicative factor for converting the readings of the tension sensor into tons, $tkm2$ is the additive factor for converting the readings of the tension sensor in tons, $C$ is the factor for converting the readings of the odometer into kilometers, $Ostep$ is the odometer step.

The last value $Tkm[n]$ is saved to a file between device power-on events.

Algorithm for Calculating the Safety Factor of the Rope

At the end of each testing cycle, the residual safety factor of the rope is calculated. For each data sample determined by the odometer step, the values of the cross-section loss (CSL) channel, the values of the localized defect (LD) channel, and the values of an inductive localized defect (ILD) channel are calculated. The values of the CSL channel are obtained by summing the signals of the Hall sensors for each data sample, which are corrected based on the readings of the temperature sensor. The values of the LD channel are obtained by subtracting the total signal of a first ring of Hall sensors from the total signal of a second ring of Hall sensors. The values of the ILD channel are obtained as the total signal of both the inductive coils.

After the entire sequence of the values of the CSL, LD and ILD channels are recorded, stresses in rope wires are calculated for each i-th data sample, taking into account the rope parameters, loading conditions and the results of rope testing by the MH sensors, namely:

$$\sigma[i,j]=G(X1,X2,X3,X4,S,D1,D2,M,i),$$

where j defines the position of a wire in the cross-section of the rope, X1 is the sequence (vector) of SL values, X2 is the sequence (vector) of LD values, X3 is the sequence (vector) of ILD values, X4 is the sequence (vector) of the readings of the temperature sensor, S is the rated working load of the rope, D1 is the rope diameter, D2 is the diameter of the rope strand, M is the parameters of the rope structure, and G is the function that is determined by the structural model of a defective rope. As such a function, it is permissible to use, for example, the function described in the following document: Volokhovsky, V. Yu., Vorontsov, A. N., Kagan, A. Ya. and Sukhorukov, V. V. Stochastic assessment of steel rope strength using magnetic NDT results, OIPEEC Technical Meeting, Lenzburg, 2003, 137-144.

Then, a stress safety factor for the most loaded wire is calculated as follows:

$$n(i, k) = \frac{\sigma_u}{\max_j \sigma(i, j)},$$

where $\sigma_u$ is the marking group for the ultimate tensile strength of a wire material.

The safety factor of the rope on the k-th testing cycle is calculated by the formula:

$$n(k) = \min_i [n(i, k)],$$

where n(i,k) is the safety factor in the i-th cross-section of the rope on the k-th testing cycle.

The decision on the technical condition of the rope is made based on the comparison of n(k) with a value n* that is equal to an admissible residual safety factor: if n(k)<n*, then further rope exploitation is unacceptable.

The parameters S, D1, D2, M, n* are set when tuning the defect detector with respect to the rope.

Algorithm for Calculating the Residual Operating Life $$\Delta Tkm[k]=F(n(k),n(k-1),n(k-2),Tkm[k],Tkm[k-1],Tkm[k-2],n^*),$$

where F(a1, a2, a3, a4, a5, a6, a7) is the linear or polynomial approximation function for calculating the residual operating life in t*km.

DETAILED DESCRIPTION OF THE INVENTION

Figure 1:
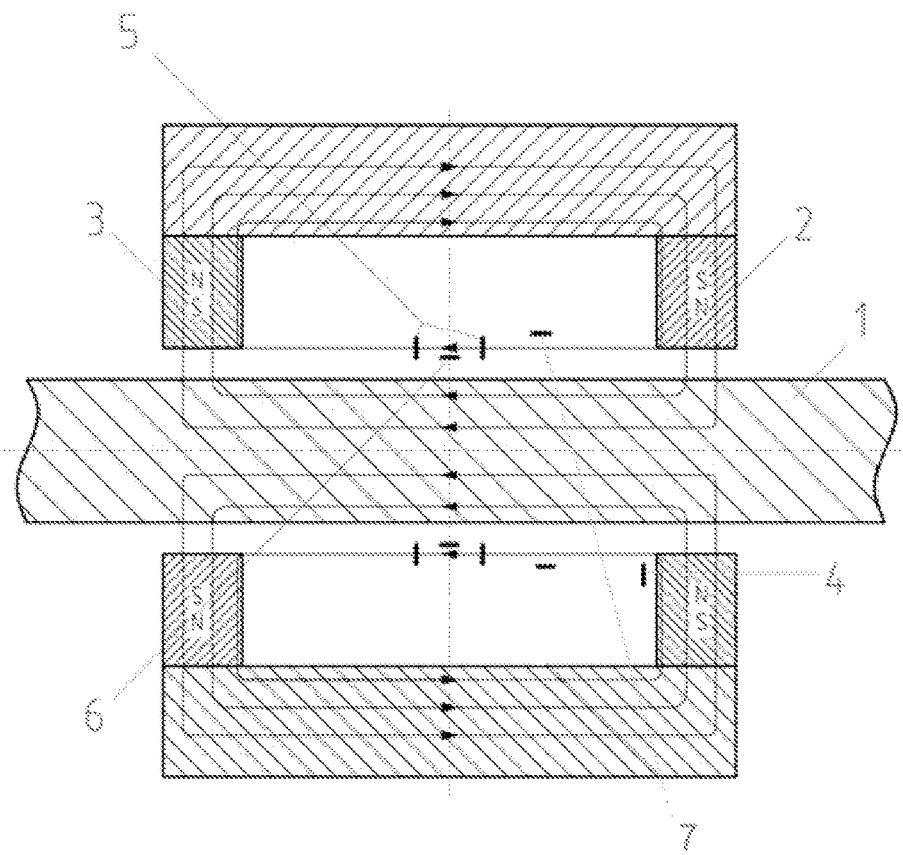
FIG. 1 shows a schematic sectional view of a sensor unit of a magnetic head.
Figure 2:
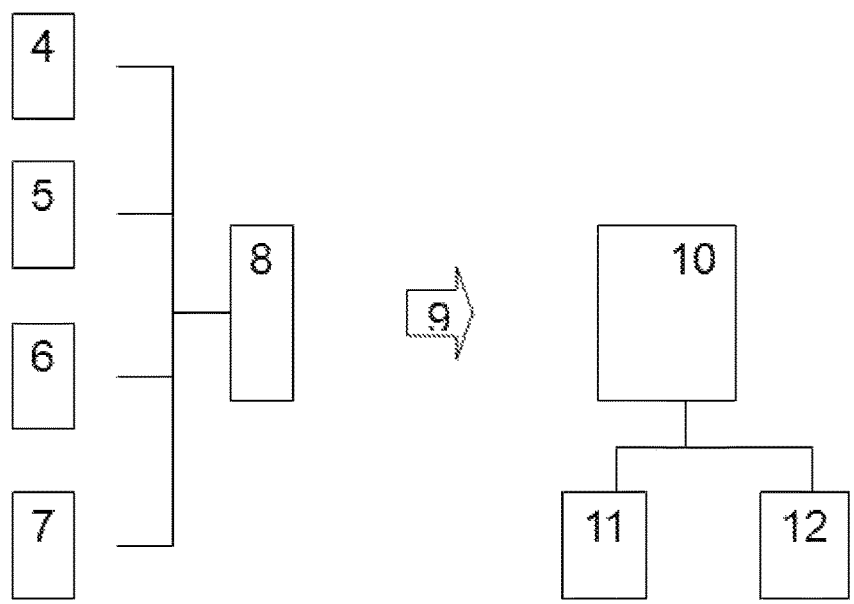
FIG. 2 shows a block diagram of a device operating in accordance with the present method.

The reference numerals shown in FIG. 1 denote: 1—a segment of a tested rope; 2, 3—permanent magnets, 4—a temperature sensor, 5—Hall sensors, 6—an inductive coil, 7—an eddy current sensor. The reference numerals shown in FIG. 2 denote: 4—the temperature sensor, 5—the Hall sensors, 6—the inductive coil, 7—the eddy current sensor, 8—a magnetic head (MH), 9—a cable for connecting the MH and a control display unit (CDU), 10—the CDU, 11—an odometer (traveled-distance meter), 12—a rope tension sensor.

The operational principle of a device using the proposed algorithm is as follows. During the operation of a mechanism exploiting the rope, readings are taken from all the sensors 4-7, 11, 12. The readings are taken simultaneously from all the sensors, since it is important to determine parameters of each specific segment of the rope during the device operation. The readings of the sensors are fed to the control display unit, which uses the above-indicated algorithms to check the operability of the rope, calculate the safety factor of the rope, and then estimate a residual operating life of the rope. After that, it is decided whether to continue the rope exploitation or to terminate its exploitation.

The value of the smallest safety factor and the position of the segment of the rope in which a similar defect is detected are stored to a memory included in the CDU.

By using the present method, it is possible to increase the accuracy of measuring the current parameters of the rope, predict the residual operating life of the rope in automatic mode, as well as decrease equipment downtime due to a more accurate prediction of the residual operating life. Given this, a planned maintenance for operated equipment are assigned more accurately. By automating the process of monitoring the condition of the rope, it is possible to increase the degree of safety of its exploitation and reduce testing costs.

The invention claimed is:

1. A method for predicting a residual operating life of a steel rope, comprising:
    continuously monitoring and diagnosing of parameters of a technical condition of the rope by continuously and simultaneously taking readings of Hall sensors, inductive coils, an eddy current sensor, a temperature sensor, a rope tension sensor and an odometer;
    providing the readings to a control display unit (CDU) for cooperative processing;
    based on the readings, determining an operating time and a safety factor of the rope;
    comparing, by the CDU, the obtained parameters with allowable values;
    making a conclusion on the technical condition of the rope; and
    predicting the residual operating life of the rope.

2. The method of claim 1, wherein the operating time of the rope is determined either based on the readings of the odometer and the rope tension sensor or based on a number of operating cycles of the rope, and wherein the safety factor is determined based on a mathematical strength model for the tested rope in concert with data of localized defect and cross-section loss channels which are obtained from the Hall sensors and the inductive coils, and data about a rope lay length and a rope diameter which are obtained from the eddy current sensor.

3. The method of claim 2, wherein the residual operating life of the rope is determined based on an obtained dependence of the safety factor on the operating time of the rope by comparing a current value of the safety factor with a maximum allowable limit of the safety factor for the rope.

4. The method of any one of claim 3, wherein the CDU sends an exploitation inhibiting signal to a control unit of equipment exploiting the rope.

5. The method of claim 1, wherein the residual operating life of the rope is determined based on an obtained dependence of the safety factor on the operating time of the rope by comparing a current value of the safety factor with a maximum allowable limit of the safety factor for the rope.

6. The method of any one of claim 1, wherein the CDU sends an exploitation inhibiting signal to a control unit of equipment exploiting the rope.

* * * * *